United States Patent [19]
Freed

[11] 3,781,683
[45] Dec. 25, 1973

[54] TEST CIRCUIT CONFIGURATION FOR INTEGRATED SEMICONDUCTOR CIRCUITS AND A TEST SYSTEM CONTAINING SAID CONFIGURATION

[75] Inventor: Larry E. Freed, Poughkeepsie, N.Y.

[73] Assignee: International Business Machines Corporation, Armonk, N.Y.

[22] Filed: Mar. 30, 1971

[21] Appl. No.: 129,429

[52] U.S. Cl.......... 324/158 F, 324/73 R, 324/158 P
[51] Int. Cl...................... G01r 31/22, G01r 15/12
[58] Field of Search.................... 324/158 F, 158 P, 324/73 R, 158 R, 106, 149; 317/101 A

[56] References Cited
UNITED STATES PATENTS

| | | | |
|---|---|---|---|
| 3,555,420 | 1/1971 | Schwartz............................ | 324/149 |
| 3,641,439 | 2/1972 | Aslan................................. | 324/106 |
| 3,437,929 | 4/1969 | Glenn................................ | 324/158 R |
| 3,539,876 | 11/1970 | Feinberg et al................. | 317/101 A |

Primary Examiner—Rudolph V. Rolinec
Assistant Examiner—Ernest F. Karlsen
Attorney—Hanifin & Jancin and Julius B. Kraft

[57] ABSTRACT

A test circuit configuration for a monolithic integrated semiconductor circuit structure containing a plurality of substantially aligned test contact with which a corresponding plurality of contactors in a testing apparatus head are engaged to provide the input/output points required for the test. The contacts are connected to testing circuits containing active and passive devices in the monolithic semiconductor structure in such a manner that no two adjacent contacts are in the same testing circuit. In a particular configuration, each testing circuit contains only alternate aligned contacts.

In wafer testing, the circuit configurations are disposed in the horizontal and vertical kerfs which in effect surround each chip, and a first test circuit configuration is repeated in the horizontal kerf while a second test circuit configuration is repeated in the vertical kerf.

6 Claims, 4 Drawing Figures

INVENTOR
LARRY E. FREED

TEST CIRCUIT CONFIGURATION FOR INTEGRATED SEMICONDUCTOR CIRCUITS AND A TEST SYSTEM CONTAINING SAID CONFIGURATION

BACKGROUND OF THE INVENTION

The present invention relates to the testing of monolithic integrated semiconductor circuits and particularly to test circuit configurations in such integrated circuit structures.

Monolithic integrated circuits comprise a complete circuit on an integral unit or chip of semiconductor material. In general, the components or devices of the circuit are embedded in and extend from the planar surface of semiconductor substrate. A typical planar monolithic integrated circuit structure is described in U.S. Pat. No. 3,539,876.

The tests performed on monolithic integrated circuits may be broken into two general categories, functional testing for circuit characteristics and tests for device characteristics. In functional testing, the integrated circuits are tested in order to determine the ability of the integrated circuits to fulfill the basic function for which they were designed. The functional tests are designed relative to the intended application of the integrated circuit. Such tests include switching threshold, saturation levels, the size of the load which the circuit is capable of driving, turn-on and turn-off times and noise immunity of the circuit. Such functional tests are usually performed directly on the integrated circuit chip by applying specific electrical inputs to specified pads or contact terminals in the chip and monitoring the electrical outputs at other pads in the chip.

Testing for device characteristics is concerned with the reliability and characteristics of the specific devices in the integrated circuits. Because the monolithic circuit involves such a complicated pattern of interconnected devices, these devices cannot be readily isolated for testing purposes. As a result, various testing arrangements have evolved in the prior art for determining device characteristics. Special test sites have been placed at various locations on a semiconductor wafer at which semiconductor devices and metallization duplicating those in the integrated circuit chips of the wafer have been formed by the same processes simultaneously with the integrated circuit devices. At such sites, the test devices are more readily accessible. In addition, in order to minimize the waste in fabricating integrated circuit chips, the kerfs between the integrated circuit chips in the wafer have been utilized as sites for such test devices and metallization.

With the ever-increasing microminiaturization of integrated circuits, the arrangement involving a few scattered test sites containing typical devices throughout the wafer has been found to be less and less satisfactory. With the increasing density of devices in each chip, such test data taken at scattered test sites throughout the wafer has not fully indicated the effects of irregularities or even inconsistencies in the semiconductor substrate on device characteristics. In other words, the substrate at the test site may be free of the irregularity or inconsistency and fail to indicate a substrate condition which would effect the performance of devices at other locations in the wafer. On the other hand, a failure due to such an irregularity at a test site could result in the needless scrapping of chips at other locations in the wafer where there is no problem with the substrate. Because of the increased cost of the denser integrated circuit chips, there is a need for the test system to characterize test devices as close as possible to the integrated circuits. In order to achieve this end, it is expedient to place the test devices in the kerf regions of the wafer between integrated circuit chips. Then while the wafer is still intact, the characteristics of the test devices are determined by engaging an appropriate test head with the contacts of the test devices situated in the kerf. In this manner, the characteristics of the devices within the particular integrated circuit at a given location may be readily predicted from the performance of corresponding test devices, and only chips which are adjacent to "failed" test devices need be scrapped. Then, during the dicing operation of wafers into chips, the kerfs are removed together with the test devices. U.S. Pat. No. 3,539,876 describes the use of the wafer kerf for test devices.

With the increasing complexity of large-scale integration and the attendant densification of integrated circuits, more and more test devices and test circuits comprising a plurality of active and passive devices are required for a comprehensive characterization of the devices in an integrated circuit chip. Since, as previously described, it is most advantageous to have such test devices and circuits in the kerf region surrounding each chip in the integrated circuit, access to the contacts in such test devices and circuits presents a problem. Because of the relatively large number of test contacts which must be crowded into the kerf region adjacent to each chip, the space between each contact in a row of such contacts in the kerf tends to fall below the minimal spacing required for the test apparatus contact heads to function effectively. In other words, the distances between contacts are less than those at which the tester contact heads are capable of maintaining a stable and consistent contactor array to engage such contacts.

A similar problem may arise during functional testing of circuit characteristics particularly when such functional circuit characteristics are tested for at the wafer level prior to dicing, i.e., the pads in the integrated circuit on the chip are contacted with an array of probes or contactors of a tester contact head. In this regard, it should be noted that the spacing between contacts permitted for the proper joining of integrated circuit chips to modules or other similar substrates is much smaller than the minimum permitted for effective access by probe in a tester contact head. Thus, we have a distinct possibility that in dense integrated circuit chips the pads or contact terminals may be spaced closer than desirable for effective access by probes or contactors in functional testing for circuit characteristics. In fact, particularly in the latter case, the pads of the integrated circuit may be so closely spaced that there is a possibility that a given probe in a tester array may short acrss two adjacent paths.

SUMMARY OF THE INVENTION

Accordingly, it is a primary object of the present invention to provide the test circuit configuration in an integrated circuit semiconductor structure wherein closely spaced contacts of the test circuit may be readily accessed by standard contact heads.

Another object of the present invention is to provide a test circuit configuration in integrated semiconductor structures having closely spaced test circuit contacts which avoid the possible short circuit by a contact head probe across the adjacent contacts.

It is a further object of the present invention to provide a test circuit configuration in an integrated circuit structure which permits effective wafer kerf device testing in dense and complex integrated circuits.

It is yet another object of the present invention to provide a system for the testing of integrated semiconductor circuits at the wafer level which permits the test characterization of the devices and metallization in each of the chips in the wafer.

The present invention makes possible the spacing of contacts in a test circuit configuration closer than the minimum limits of standard tester heads by a test circuit configuration in the integrated semiconductor structure comprising a plurality of substantially aligned contacts and a plurality of testing circuits, each comprising at least one active or passive device and conductive means such as metallization conecting said device to two of said contacts exclusively. The test circuit configuration is arranged so that no two adjacent contacts are in the same testing circuit. With such a circuit configuration, together with a sequence of at least two applications of the tester contact head to a line of test contacts, the contactor or probe array in the test head may be more loosely spaced. The contactor head may be arranged so that on a first pass or head application a set of non-adjacent contacts in a set of testing circuits are engaged followed by a second pass in which non-adjacent contacts which were not previously engaged are engaged by the tester contact head.

The preferable arrangement in the test circuit configuration is one in which each testing circuit contains only alternate contacts. This permits the tester head to engage all of the contacts in a given line or row in two passes a first pass in which alternate contacts are engaged followed by a second pass in which the opposite alternate contacts are engaged by the contactor array in the tester head.

An additional advantage of such a test circuit configuration and test system is that even when a probe or contactor is so relatively wide that it shorts across the space between two adjacent contacts, there is no effect since the two contacts are not in the same circuit configuration and the adjacent contact is in a circuit which is not otherwise contacted on the particular pass and is therefore in a floating mode which will not effect the circuit being tested.

The foregoing and other objects, features and advantages of the invention will be apparent from the following more particular description and preferred embodiments of the invention as illustrated in the accompanying drawings.

DESCRIPTION OF THE PREFERRED EMBODIMENTS

Figure 2:
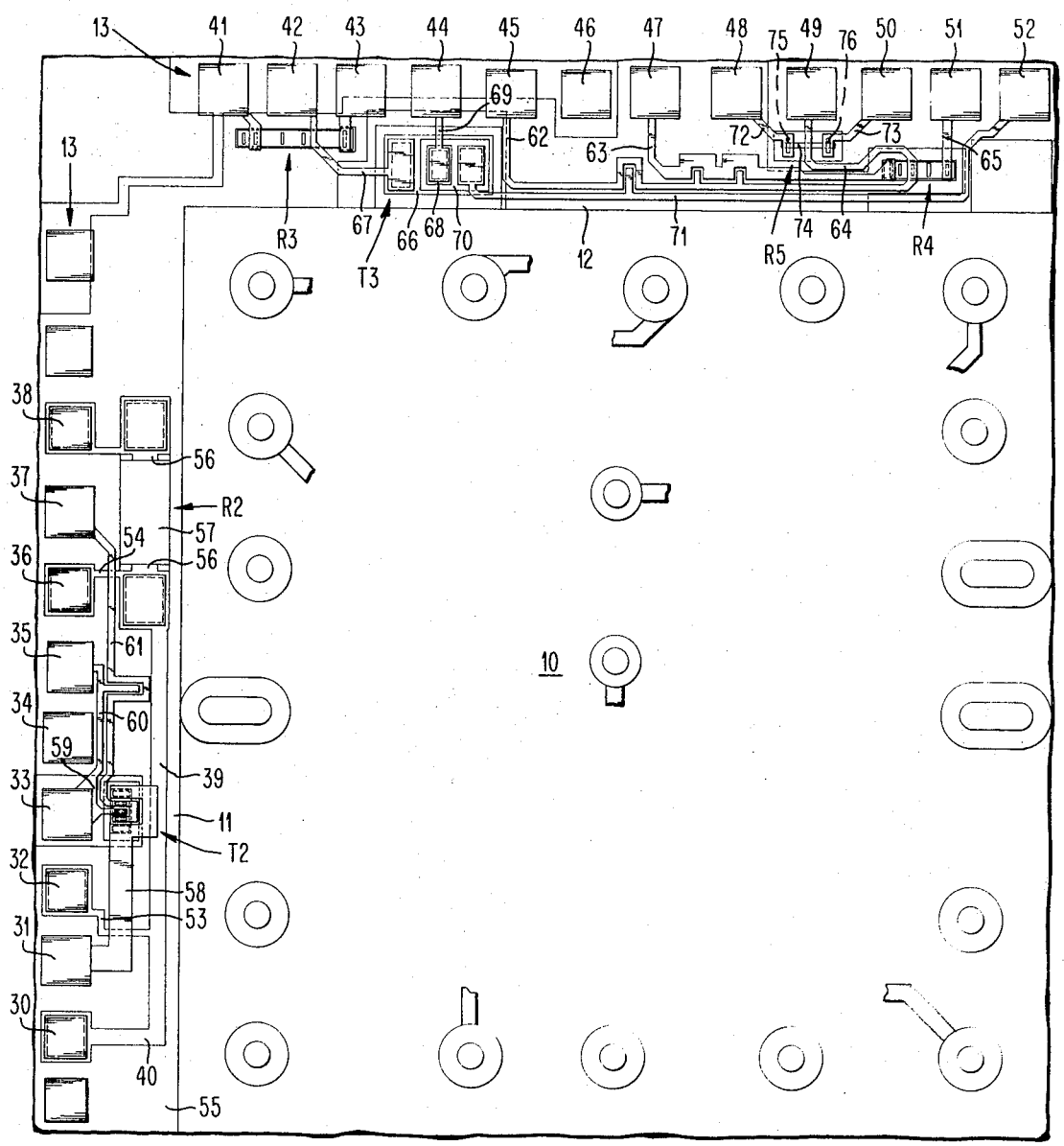
FIG. 2 is a top view of the planar surface of a section of an integrated circuit wafer in which a chip is shown diagrammatically and a horizontal leg and a vertical leg of the kerf surrounding the chip containing the repeated vertical test circuit configuration and horizontal test circuit configuration shown in detail.
Figure 3:
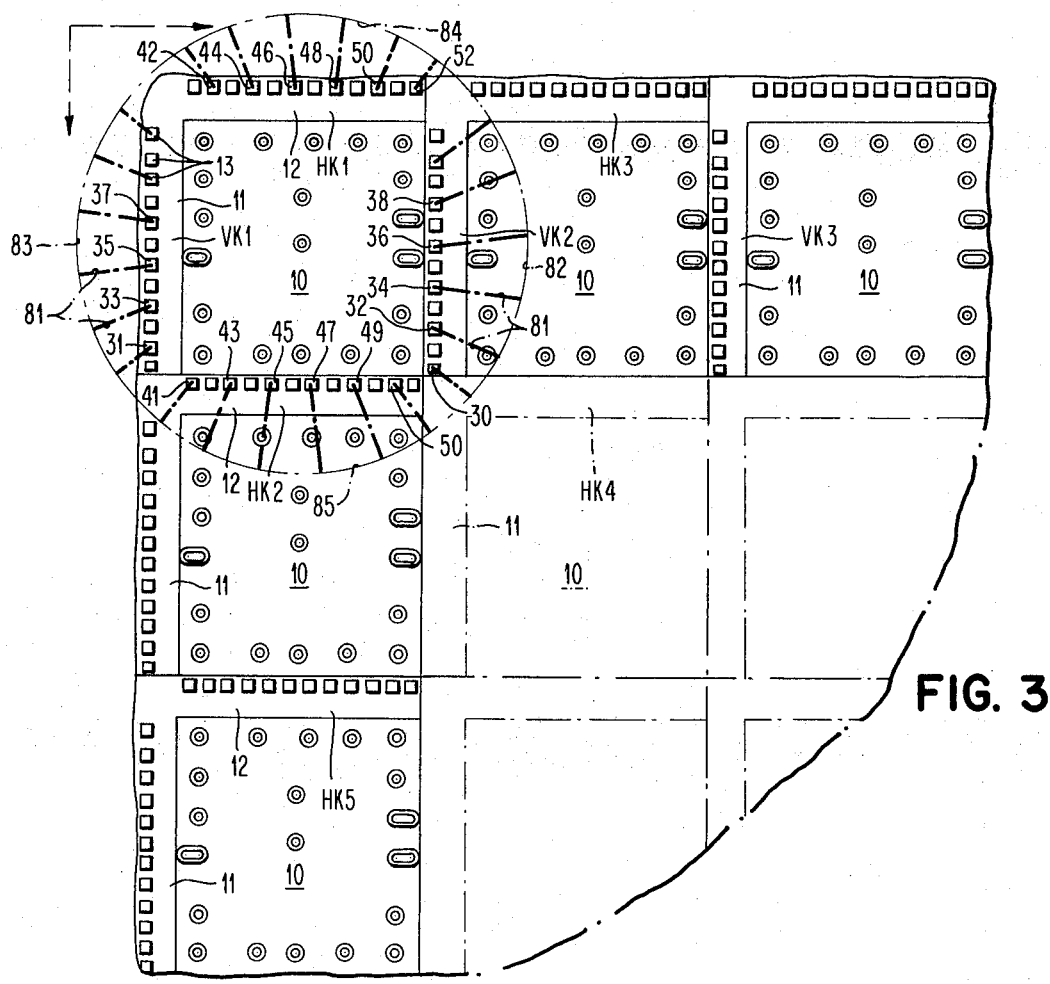
FIG. 3 is a diagrammatic top view of the planar surface of a section of the wafer showing a plurality of integrated circuit chips and the contacts of a repeated test circuit configuration in the kerfs.

With reference to Figs. 2 and 3, FIG. 3 shows a portion of a wafer containing a plurality of integrated circuit chips 10, each surrounded by a vertical kerf 11 and a horizontal kerf 12. FIG. 2 shows an enlarged chip 10 together with one of its horizontal kerfs 12 and vertical kerfs 11 with the horizontal and vertical kerf test circuit configuration being shown in detail. The test circuit configuration in the horizontal kerf is repeated in each horizontal kerf between the chips and the test circuit configuration in the vertical kerf is repeated in each vertical kerf. In FIG. 3, for purposes of clarity, the whole test circuit configuration is not shown in each kerf and the test contacts 13 shown are representative of the test circuit configurations detailed in FIG. 2.

Likewise, for purposes of clarity, I have not shown details of the integrated circuit devices or metallization within the chips 10. These integrated circuits may be considered to correspond in general structure to the integrated circuits described in U.S. Pat. No. 3,539,876, and the integrated circuit devices and metallization may be advantageously fabricated utilizing the processes described in this patent. Likewise, the test circuit configuration devices, such as resistors and transistors and metallization which correspond to the devices in the integrated circuit may be also advantageously fabricated in accordance with the processes described in U.S. Pat. No. 3,539,876.

Figure 1:
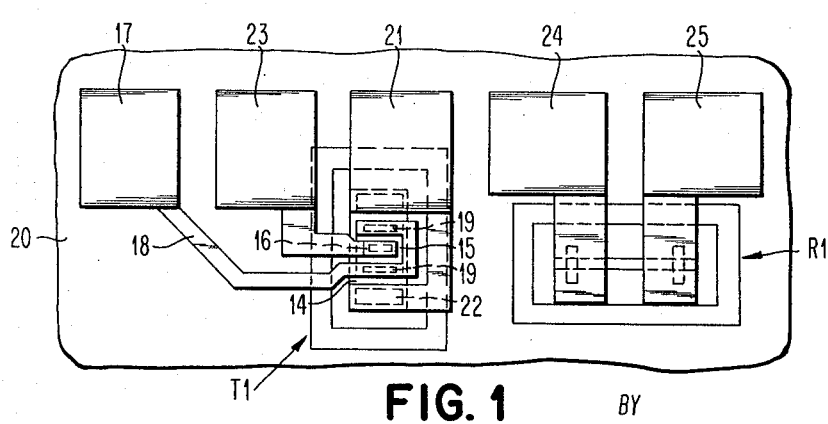
FIG. 1 is a top view of a fragment of a planar surface and the kerf of an integrated circuit wafer structure in which adjacent test contacts are in the same test circuit.

FIG. 1 is a plan view of a less than advantageous test circuit configuration in the kerf of a wafer which the present invention tries to avoid. Transistor T1 comprises N collector region 14, P type base region 15 and N+ emitter region 16. Test contact or pad 17 is connected to base region 15 through metallization line 18 which connects to the base region through openings 19 in the insulative layer 20 which is between the test contacts and metallization and the underlying semiconductor substrate. Likewise, pad 21 is connected to transistor T1 collector region 14 through contact 22. Pad 23 is, in turn, connected to the emitter 16 of transistor T1 in a similar fashion. In another testing circuit, pads 24 and 25 are both connected to resistor R1. Thus, in the testing circuits shown, adjacent contacts 17, 23, and 21 are in the same testing circuit while adjacent contacts 24 and 25 are also in one testing circuit. Such a test circuit configuration presents a problem of access with standard tester contact heads where the test contacts must be spaced very close to each other such as is the case with contacts 17, 23 and 21. Because of high test circuit density, the contactor or probe array in standard tester contact heads cannot be arranged close enough consistently and correctly engage contacts or pads spaced in the order of from 1 to 2 mils from each other.

It is for this reason that the test circuit configuration and the testing system of the present invention utilize testing circuits in which no two adjacent test contacts or pads are in the same testing circuit. With reference to FIG. 2, a typical test circuit configuration in accordance with the present invention will now be described. With respect to the test circuit configuration in the vertical kerf 11, it comprises two testing circuits. The first testing circuit which will be designated as the "even circuit" comprises alternate contact pads 30, 32, 36, and 38 while the second or "odd" test circuit comprises opposite alternate pads 31, 33, 35, and 37.

For convenience in description, when describing the "odd and even" testing circuits in the vertical kerf, I will only briefly describe the devices in the testing circuit as these devices are relatively standard devices which have been previously described in other patents. My primary concern is to illustrate the relationship of adjacent contacts or pads with respect to the testing circuits in which such pads are located.

In the "even" testing circuit, pads 30, 32, and 36 are respectively connected to P type resistor 39 by means of P type resistor legs 40, 53, and 54. The resistor and the resistor legs have a structure similar to that of the resistor shown in FIG. 1R, Step 5 of U.S. Pat. No. 3,539,876 with region 55 serving as the N type region which surrounds the P type resistors. Resistor 39 is also connected with resistor structure R2 which is in turn connected to contact pad 38. Resistor R2 has a structure similar to the kerf resistor of the test structure shown in FIGS. 4, 5, and 6 and described in Columns 19 and 20 of U.S. Pat. No. 3,539,876. The specific structure of resistor R2 is the "dumbbell" resistor structure shown and described in U.S. Pat. No. 3,465,427 with P type region of U.S. Pat. No. 3,539,876. The specific structure of resistor R2 is the dumbbell resistor structure shown and described in U.S. Pat. No. 3,465,427 with P type region 56 passing under N region 57.

With respect to the odd testing circuit in the vertical kerf configuration, pad 31 is connected to the collector of transistor T2 by metallization segment 58, pads 33 and 35 are both connected to the emitter of transistor T2 respectively by metallization segments 59 and 60, and pad 37 is connected to the base of transistor T2 through metallization segment 61. Transistor T2 essentially has the structure described in Step 7 of FG. 1T of U.S. Pat. No. 3,539,876. Thus, in the test circuit configuration in the vertical kerf, the alternate or odd pads are in one testing circuit and the opposite alternate or even pads are in the second testing circuit. This vertical test circuit configuration is repeated in the vertical kerf between each chip.

Likewise, in the horizontal kerf test circuit configuration, odd pads 41 and 43 are connected to resistor R3 to provide a first odd testing circuit. Resistor R3 also has a structure similar to that shown in Step 5, FIG. 1R of U.S. Pat. No. 3,539,876. In a like fashion, odd pads 45, 47, 49 and 51 are all connected to resistor R4 respectively by metallization segments 62, 63, 64, and 65 to provide the second odd testing circuit. Resistor R4 has substantially the same structure as resistor R3.

With respect to the even testing circuits in the horizontal kerf, pads 42, 44 and 52 are connected to transistor T3 to provide the first even testing circuit in the horizontal configuration; pad 42 is connected to collector 66 of transistor T3 by metallization segment 67, pad 44 is connected to emitter 68 of transistor T3 by metallization segment 69 and pad 52 is connected to base 70 of transistor T3 by metallization segment 71. Except for its planar dimensions, transistor T3 has essentially the same structure as transistor T2.

Pads 48 and 50 are connected to resistor R5 respectively through metallization segments 72 and 73 to provide the second even testing circuit. Resistor R5 has a structure similar to that of the resistor shown in FIG. 2R, Step 7 of U.S. Pat. No. 3,539,876. It comprises a buried N+ region 74 and a pair of N+ contact diffusions 75 and 76 to which metallization segments 72 and 73 are respectively connected.

The test circuit configuration in the horizontal kerf has four testing circuits; these are arranged in two sets of two circuits each. The first or odd set which contain the first or second odd testing circuits is connected to the odd or alternative pads in the horizontal kerf while the second or even set which contains the first and second even test circuits is connected to the opposite alternative or even pads in the horizontal kerf. This horizontal circuit configuration is repeated in each of the horizontal kerfs between the chips.

Figure 4:
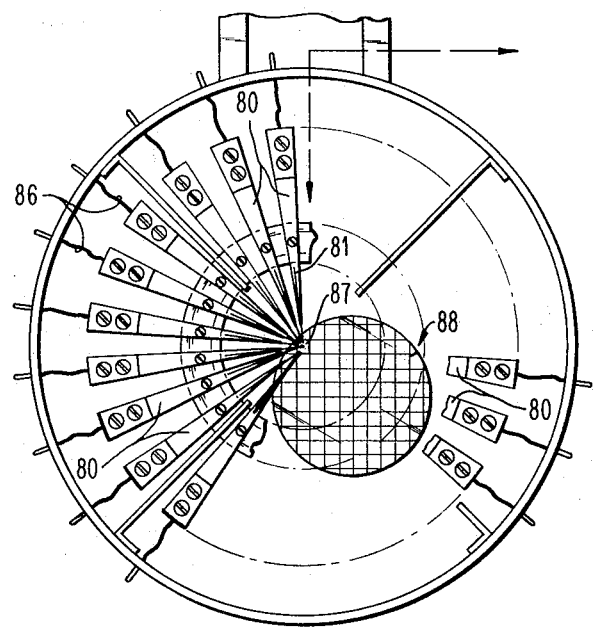
FIG. 4 is a fragmentary diagrammatic top view of a tester head to illustrate the relationship of the contactor array in the head with respect to the wafer being tested.

Referring now to FIGS. 3 and 4, it will be illustrated how all the test circuitry and all of the kerfs surrounding the chips under test may be accessed with a standard tester contact head in two passes per kerf, i.e. each kerf is contacted twice; the odd pads are contacted in one pass for each kerf, and the even pads contacted in another pass per kerf. In FIG. 4, there is illustrated a fragmentary top view of a tester contact head which contains a plurality of contactor arms 80 radially mounted in fixed positions and converging in conical fashion into an array of contactors 81 which engage the contacts in the kerf surrounding a given ship 87 on a wafer 88 mounted below the tester head in such a manner that the tester head may be stepped vertically and horizontally with respect to the wafer in increments or steps of one chip per step.

To better illustrate the testing procedure, reference is made to FIG. 3. In FIG. 3, the tester head is illustrated diagramatically by phantom lines with a phantom line engaging each of the kerf test contacts on the chip which is to be engaged in the pass shown. Thus, with the initial position of the contact head shown in FIG. 3, the contacts in the first vertical kerf, VK1 are engaging the odd numbered pads, e.g., pads 31, 33, 35, and 37 and, therefore, the odd vertical testing circuit is under test. At the same time, in the second vertical kerf around the chip VK2, the contactors 81 are engaging the opposite alternate pads, or even pads, and, therefore, the even testing circuit in this kerf is under test while the odd testing circuit is inactive. In a like fashion, in the first horizontal kerf HK1, the contactors 81 are in engagement with the even pads, e.g., pads 42, 44, 46, 48, 50 and 52 to place the even set of testing circuits under test while the odd set is inactive. At the same time, in the second horizontal kerf, HK2, the contactors are in engagement with the opposite alternate pads or odd pads to place the odd set of testing circuits under test while the even set is inactive.

Consider now the position of the contact head with respect to the kerf configuration when the tester head is stepped one increment or chip to the right in the structure shown in FIG. 3. At this second stage, the leading edge 82 of the contactor head will be adjacent the third kerf VK3 and the contacts 81 at this leading edge will be in contact with the even pads in this third vertical kerf to place the even test circuit under test. At the same time, the trailing edge 83 of the tester head will now be proximate the second vertical kerf VK2, and the odd pads in VK2 which were not contacted in the first pass or application of the tester head are now in engagement with contacts 81 to place the odd test circuit under test. In this fashion, contact is made with both the odd contacts and even contacts in kerf VK2 during this pair of passes. This assures that the entire test circuit configuration in kerf VK2 including both the odd and even testing circuits will be tested in this pair of passes. Similarly, at the end of the third pass, the trailing edge 83 will be adjacent kerf VK3, and the odd test circuit in kerf VK3 will be under test to complete the testing of the test circuit configuration in kerf VK3.

Considering now the engagement of the test circuit configuration in the horizontal kerf with the tester head, in the initial position of the tester head shown in FIG. 3, the top edge of the tester head 84 will be adjacent first horizontal kerf, HK1 and its contactors 81 will be in contact with the even pads, e.g., pads 42, 44, 46, 48, 50 and 52 to place the odd set of testing circuits in HK1 under test. At the same time the bottom edge 85 of the tester head will be adjacent the second horizontal kerf, HK2 and its contactors 81 will be engaged with the odd pads in the test circuit configuration in HK2 to, thereby, placing the odd set of testing circuit in HK2 under test. Then, during the previously described step of one chip from left to right, the contactors will still contact the even pads in the upper kerf HK3 and the odd pads in the lower kerf HK4 of the next chip. This type of engagement with respect to the horizontal kerfs will continue until the top horizontal row of chips has been tested. At this stage, the tester head will be stepped down one increment to the next row of chips, thereby bringing the top edge 84 adjacent to kerf HK2 while the bottom edge of the tester head is adjacent to lower kerf HK5. This will constitute the second pass for kerf HK2, and the even pads which were not contacted on the first pass with respect to HK2 will now be contacted to place the even set of testing circuits under test. This second pass will complete the testing of the horizontal test circuit configuration kerf HK2. Then, when the tester head is stepped one increment to the right on the second row, the test pads in kerf HK4 will be subjected to their second pass and the testing of the horizontal test circuit configuration in HK4 will be completed and so on as tester head is stepped from left to right along the second row. It is, thus, seen how in two passes per kerf the entire test circuit configuration in each kerf is tested.

This dual pass arrangement per kerf permits the use of a conventional tester contact head in which the contactor array may be arranged with much wider spacing between contactors than would be permitted if the contactors had to contact each pad in the dense test circuit configuration. By this system, instead of it being necessary for the contactors to be spaced from each other by only the width of the space between two pads, the contactors may be spaced from each other by a distance in the order of the width of two such spaces plus one pad width.

It should be noted that with respect to the tester contact head shown in FIG. 4, the structure is merely illustrative of standard tester contact heads known in the art. Because the means for moving such a head in a translational direction are well known in the art, these have not been shown. Data sensed by contactors 81 is transmitted through the contactor arms 80 to leads 86 which in turn transmit the sensed information to appropriate testing apparatus which interpret the information sensed.

While principles of the present invention have been illustrated with respect to kerf test circuit configurations for the characterization of devices which circuitry is removed during the dicing of the wafer into chips, the present application is also applicable to functional testing of the integrated circuitry on the chip proper. In such a case, the pads of the chip proper will serve as the test contact pads during the testing of the chip. Of course, in order to practice the present invention in such functional testing of integrated circuits, the actual integrated circuits on the chips would have to be designed and laid out so that no two adjacent integrated circuit pads would be in the same testing circuit during the testing procedure.

While the invention has been particularly shown and described with reference to a preferred embodiment thereof, it will be understood by those skilled in the art that various changes in form and detail may be made therein without departing from the spirit and scope of the invention.

What is claimed:

1. In a testing system of monolithic integrated semiconductor circuit structures,
   the combination of
   a wafer containing an array of integrated circuit chips spaced from each other by horizontal and vertical kerfs,
   first and second test circuit configurations in said kerfs, each configuration comprising
   a plurality of substantially aligned contacts, and
   a plurality of testing circuits, each comprising at least one active or passive device and conductive means connecting said at least one device with at least two of said contacts exclusively,
   said test circuit configurations being arranged so that each testing circuit contains only alternate contacts,
   said first test circuit configuration being repeated in a sequential plurality of vertical kerfs and said second test circuit configuration being repeated in a sequential plurality of horizontal kerfs, and
   a tester contact member comprising
   a plurality of contactors arranged in a pair of vertical rows and a pair of horizontal rows for respectively contacting the aligned contacts in the pair of vertical kerfs and the pair of horizontal kerfs surrounding a chip,
   said first vertical row of contactors being arranged to contact alternate contacts in the first vertical kerf and said second vertical row of contactors being arranged to contact the opposite alternate contacts in the second vertical kerf, and said first horizontal row of contactors being arranged to contact alternate contacts in the first horizontal kerf and said second horizontal row of contactors being arranged to contact the opposite alternative contacts in the second horizontal kerf, and
   means for stepping the tester contact member across the wafer in the horizontal and in the vertical directions whereby the tester contacts the kerfs surrounding a plurality of chips.

2. The testing system of claim 1 wherein the stepping means step the tester contact member in steps of one chip each in both directions whereby all of the kerf contacts surrounding each chip tested are contacted by said member.

3. In a testing system for monolithic integrated semiconductor circuit structures,
the combination of
a test circuit configuration in said monolithic integrated circuit comprising
a plurality of substantially aligned spaced contacts, and
a plurality of testing circuits, each comprising at least one active or passive device and conductive means connecting said at least one device with at least two of said contacts exclusively and each of said testing circuits being arranged so that at least one of its contacts is adapted to receive an input test signal and at least one contact produces an output test signal, said test circuit configuration being arranged so that each testing circuit contains only alternate contacts, and a tester contact member comprising
a plurality of contactors adapted to engage sets of alternate aligned contacts, said contactors each having a dimension in the plane of said engagement at least equal to the space between adjacent aligned contacts, and
means for applying test input signals through said contactors to said contacts and for sensing test output signals from said contacts through said contactors.

4. A method of testing monolithic integrated semiconductor circuit structures which permits minimal spacing between test contacts on said structures comprising
arranging in said monolithic integrated circuit a test circuit configuration containing a plurality of substantially aligned test contacts and a plurality of testing circuits, each comprising at least one active or passive device connected to at least two of said test contacts exclusively so that each testing circuit contains only alternate test contacts and each of said testing circuits being arranged so that at least one of its contacts is adapted to receive an input test signal and at least one contact produces an output test signal, and
contacting with testing means a first set of alternate test contacts followed by contacting with said testing means a second set of opposite alternative test contacts whereby all of the aligned test contacts in said testing circuits are contacted.

5. The method of claim 4 wherein a plurality of said test circuit configurations are arranged in an integrated circuit wafer, containing an array of integrated circuit chips spaced from each other by parallel kerf, so that each of said plurality of test circuit configurations is in a sequential parallel kerf, and
said contacting step is sequentially repeated for each test circuit configuration.

6. In a testing system for monolithic integrated semiconductor circuit structures,
the combination of
a test circuit configuration in said monolithic integrated circuit comprising
a plurality of substantially aligned spaced contacts, and
a plurality of testing circuits, each comprising at least one active or passive device and conductive means connecting said at least one device with at least two of said contacts exclusively and each of said testing circuits being arranged so that at least one of its contacts is adapted to receive an input test signal and at least one contact produces an output test signal, said test circuit configuration being arranged so that each testing circuit contains only alternate contacts, and a tester contact member comprising
a plurality of contactors adapted to engage sets of alternate aligned contacts, and
means for applying test input signals through said contactors to said contacts and for sensing test output signals from said contacts through said contactors.

* * * * *